United States Patent
Hirakawa et al.

(10) Patent No.: US 12,060,453 B2
(45) Date of Patent: Aug. 13, 2024

(54) POLYESTER CARBONATE RESIN, AND MOLDED BODY WHICH IS OBTAINED BY MOLDING RESIN COMPOSITION CONTAINING RESIN

(71) Applicant: MITSUBISHI GAS CHEMICAL COMPANY, INC., Tokyo (JP)

(72) Inventors: Manabu Hirakawa, Kanagawa (JP); Eiichi Honda, Kanagawa (JP); Yasuaki Yoshimura, Kanagawa (JP); Yuichiro Satake, Kanagawa (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 574 days.

(21) Appl. No.: 17/437,565

(22) PCT Filed: Mar. 10, 2020

(86) PCT No.: PCT/JP2020/010280
§ 371 (c)(1),
(2) Date: Sep. 9, 2021

(87) PCT Pub. No.: WO2020/189409
PCT Pub. Date: Sep. 24, 2020

(65) Prior Publication Data
US 2022/0135736 A1    May 5, 2022

(30) Foreign Application Priority Data

Mar. 15, 2019   (JP) ................. 2019-048783

(51) Int. Cl.
*C08G 63/64* (2006.01)
*G02B 1/04* (2006.01)
*C08G 64/02* (2006.01)

(52) U.S. Cl.
CPC ............. *C08G 63/64* (2013.01); *G02B 1/041* (2013.01); *C08G 64/0208* (2013.01)

(58) Field of Classification Search
None
See application file for complete search history.

(56) References Cited

U.S. PATENT DOCUMENTS

| | | | |
|---|---|---|---|
| 4,950,736 A * | 8/1990 | Sasaki | C08G 64/0208 528/370 |
| 10,048,404 B2 | 8/2018 | Kato et al. | |
| 10,605,956 B2 | 3/2020 | Kato et al. | |
| 2017/0088504 A1 | 3/2017 | Motoi et al. | |
| 2017/0276837 A1 | 9/2017 | Kato et al. | |
| 2018/0050978 A1* | 2/2018 | Watanabe | C07C 67/313 |
| 2018/0142059 A1* | 5/2018 | Honda | C07C 69/757 |
| 2018/0273466 A1 | 9/2018 | Motoi et al. | |
| 2018/0305494 A1 | 10/2018 | Satake et al. | |
| 2019/0033489 A1 | 1/2019 | Kato et al. | |
| 2019/0106376 A1 | 4/2019 | Motoi et al. | |
| 2019/0225571 A1 | 7/2019 | Motoi et al. | |
| 2020/0033523 A1 | 1/2020 | Yoshimura et al. | |

FOREIGN PATENT DOCUMENTS

| | | |
|---|---|---|
| EP | 3 351 577 A1 | 7/2018 |
| JP | 2-69520 A | 3/1990 |
| JP | 5-70584 A | 3/1993 |
| JP | 5-155964 A | 6/1993 |
| JP | 2007-161917 A | 6/2007 |
| WO | 2015/147242 A1 | 10/2015 |
| WO | 2016/052370 A1 | 4/2016 |
| WO | 2017/047555 A1 | 3/2017 |
| WO | 2018/062326 A1 | 4/2018 |

OTHER PUBLICATIONS

International Search Report issued in International Patent Application No. PCT/JP2020/010280 dated May 26, 2020, along with English Translation thereof.
Written Opinion of the International Searching Authority issued in International Patent Application No. PCT/JP2020/010280 dated May 26, 2020, along with English Translation thereof.
Extended European Search Report issued in corresponding European Patent Application No. 20773792.5 dated Apr. 8, 2022.

* cited by examiner

*Primary Examiner* — David J Buttner
(74) *Attorney, Agent, or Firm* — GREENBLUM & BERNSTEIN P.L.C.

(57) ABSTRACT

Provided is a polyester carbonate resin having a constituent unit (I) represented by the following general formula (1), a constituent unit (II) represented by the following general formula (2), and a constituent unit (III) represented by the following general formula (3):

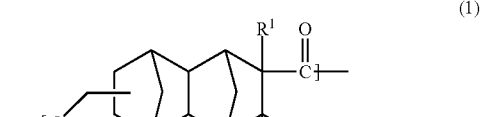

(1)

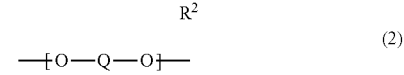

(2)

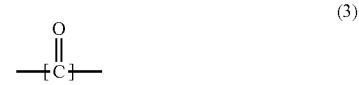

(3)

wherein, in the above formula (1), $R^1$ to $R^3$ each independently represent a hydrogen atom, a methyl group or an ethyl group, and in the above formula (2), Q represents a divalent linking group.

14 Claims, No Drawings

POLYESTER CARBONATE RESIN, AND MOLDED BODY WHICH IS OBTAINED BY MOLDING RESIN COMPOSITION CONTAINING RESIN

TECHNICAL FIELD

The present invention relates to a polyester carbonate resin, and a molded body which is obtained by molding a resin composition comprising the resin.

BACKGROUND ART

As materials for optical elements used in the optical systems of various types of cameras, such as a camera, a film-integrated camera and a video camera, optical glasses or optical transparent resins have been used.

As such optical glasses, many types of materials that are excellent in heat resistance, transparency, dimensional stability, chemical resistance and the like, and have various refractive indexes (nD) or Abbe numbers (vD) have existed. However, these optical glasses have been problematic in terms of high material costs, poor formability and low productivity. In particular, since the processing of the optical glasses into aspherical lens used in aberration correction requires extremely high techniques and high costs, which cause major obstacles for the practical use thereof.

On the other hand, an optical lens consisting of an optical transparent resin, in particular, a thermoplastic transparent resin, is advantageous in that it can be produced in a large amount by injection molding, and also in that an aspherical lens can be easily produced from the optical lens. At present, such optical lenses have been used as lenses for cameras.

Various polycarbonate resins have been developed as thermoplastic transparent resins used for optical purposes For example, Patent Literatures 1 and 2 disclose a polycarbonate copolymer comprising a perhydroxydimethanonaphthalene skeleton as a material that can be used for optical purposes, instead of an optical glass.

In addition, Patent Literature 3 discloses, as a resin capable of producing an optical lens with a high Abbe number, a polycarbonate resin that is made from decahydro-1,4:5,8-dimethanonapthanediol (D-NDM) as a raw material and has specific constituent units.

CITATION LIST

Patent Literature

Patent Literature 1: JP-A-H05-70584
Patent Literature 2: JP-A-H02-69520
Patent Literature 3: WO2016/052370A1

SUMMARY OF INVENTION

Technical Problem

By the way, the perhydroxydimethanonaphthalene skeleton possessed by the polycarbonate copolymer disclosed in each of Patent Literatures 1 and 2 has low strength, since the position of a dihydroxymethyl group is position 2,3 in both cases.

The polycarbonate resin disclosed in Patent Literature 3 is excellent in that an optical lens having a high Abbe number can be produced therefrom. However, it is desired to develop an optical material that can be used to produce a molded body having more excellent optical properties.

Solution to Problem

The present inventors have found that a polyester carbonate resin having specific constituent units can achieve the aforementioned object, thereby completing the present invention.

Specifically, the present invention provides the following [1] to [14].

[1] A polyester carbonate resin having a constituent unit (I) represented by the following general formula (1), a constituent unit (II) represented by the following general formula (2), and a constituent unit (III) represented by the following general formula (3):

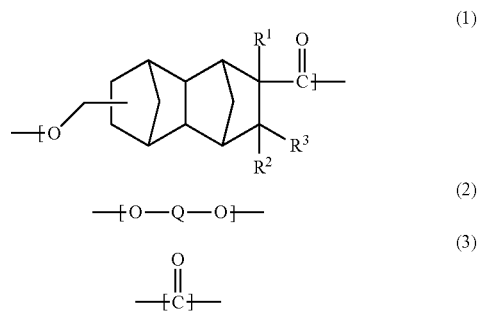

wherein, in the above formula (1), $R^1$ to $R^3$ each independently represent a hydrogen atom, a methyl group or an ethyl group, and in the above formula (2), Q represents a divalent linking group.

[2] The polyester carbonate resin according to the above [1], wherein the constituent unit (I) comprises a constituent unit (Ia) derived from a compound represented by the following general formula (1a) and a constituent unit (Ib) derived from a compound represented by the following general formula (1b):

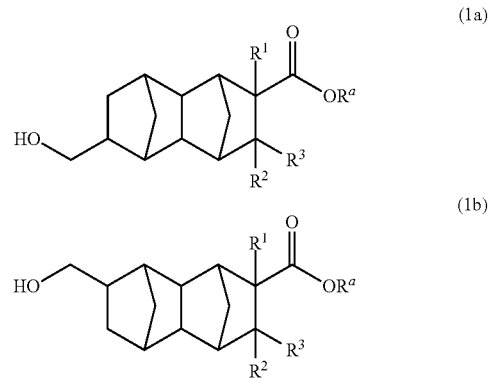

wherein, in the formulae (1a) and (1b), $R^1$ to $R^3$ are the same as those in the general formula (1), and $R^a$ represents an alkyl group containing 1 to 4 carbon atoms.

[3] The polyester carbonate resin according to the above [2], wherein a content ratio [(Ia)/(Ib)] between the constituent unit (Ia) and the constituent unit (Ib) is 1/99 to 99/1 at a mass ratio.

[4] The polyester carbonate resin according to any one of the above [1] to [3], wherein Q in the general formula (2) is a group selected from among an alkylene group containing 1 to 10 carbon atoms, an alicyclic hydrocarbon group containing 3 to 30 ring-forming carbon atoms, an aromatic hydrocarbon groups containing 6 to 30 ring-forming carbon atoms, a heterocyclic group containing 3 to 30 ring-forming atoms, and a divalent linking group formed by combining two or more of these groups with one another.

[5] The polyester carbonate resin according to any one of the above [1] to [4], wherein Q in the general formula (2) is a divalent linking group represented by any of the following formulae (a) to (c):

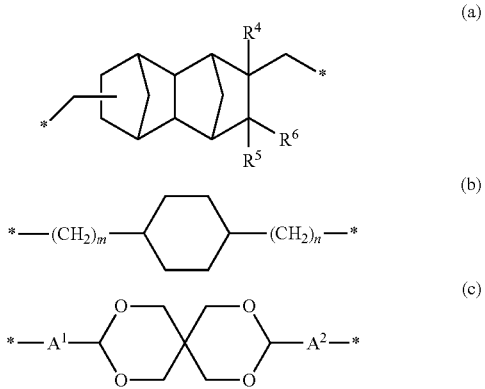

wherein * represents a binding site; $R^4$ to $R^6$ each independently represent a hydrogen atom or an alkyl group containing 1 to 6 carbon atoms, m and n each independently represent an integer of 0 to 4, and $A^1$ and $A^2$ each independently represent an alkylene group containing 1 to 10 carbon atoms.

[6] The polyester carbonate resin according to any one of the above [1] to [5], wherein the constituent unit (II) comprises a constituent unit (II-A) represented by the following general formula (2-a):

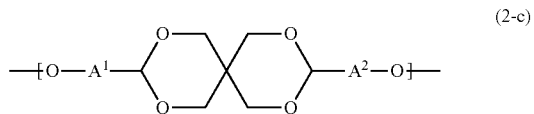

wherein $R^4$ to $R^6$ each independently represent a hydrogen atom or an alkyl group containing 1 to 6 carbon atoms.

[7] The polyester carbonate resin according to any one of the above [1] to [5], wherein the constituent unit (II) comprises a constituent unit (II-B) represented by the following general formula (2-b):

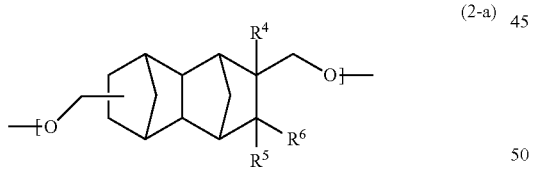

wherein m and n each independently represent an integer of 0 to 4.

[8] The polyester carbonate resin according to any one of the above [1] to [5], wherein the constituent unit (II) comprises a constituent unit (II-C) represented by the following general formula (2-c):

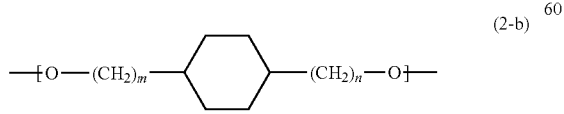

wherein $A^1$ and $A^2$ each independently represent an alkylene group containing 1 to 10 carbon atoms.

[9] The polyester carbonate resin according to any one of the above [1] to [8], wherein a content ratio [(I)/(II)] between the constituent unit (I) and the constituent unit (II) is 1/99 to 99/1 at a molar ratio.

[10] The polyester carbonate resin according to any one of the above [1] to [9], wherein the weight average molecular weight (Mw) of the polyester carbonate resin is 5,000 to 50,000.

[11] The polyester carbonate resin according to any one of the above [1] to [10], wherein the glass transition temperature (Tg) of the polyester carbonate resin is 135° C. or higher.

[12] The polyester carbonate resin according to any one of the above [1] to [11], wherein the specific gravity of the polyester carbonate resin is less than 1.20.

[13] A molded body formed by molding a resin composition comprising the polyester carbonate resin according to any one of the above [1] to [12].

[14] The molded body according to the above [13], which is an optical member.

Effects of Invention

The polyester carbonate resin of a preferred aspect of the present invention is a material excellent in moldability because it has a high glass transition temperature and favorable fluidity. At the same time, the present polyester carbonate resin can be used to produce a molded body having excellent optical properties, and for example, it may become a material for forming a molded body having low specific gravity, low birefringence, and reduced photoelastic coefficient.

DESCRIPTION OF EMBODIMENTS

[Polyester Carbonate Resin]

The polyester carbonate resin of the present invention has a constituent unit (I) represented by the following general formula (1), a constituent unit (II) represented by the following general formula (2), and a constituent unit (III) represented by the following general formula (3):

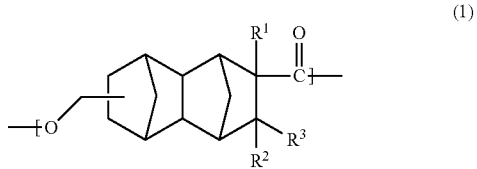

(3)

In the above general formula (1), $R^1$ to $R^3$ each independently represent a hydrogen atom, a methyl group, or an ethyl group. In addition, in the above formula (2), Q represents a divalent linking group.

Since the polyester carbonate resin of the present invention has the above-described constituent unit (I), it can be processed into a resin having a high glass transition temperature. Moreover, when a molded body is formed using the polyester carbonate resin of the present invention, the present polyester carbonate resin contributes to the achievement of a molded body having low specific gravity, low birefringence, and reduced photoelastic coefficient.

However, since a polyester resin only consisting of the above-described constituent unit (I) has poor fluidity, it has a problem regarding a reduction in moldability.

In order to solve this problem, the polyester carbonate resin of the present invention has been prepared as a copolymer having a constituent unit (II) as well as the constituent unit (I). Hence, the fluidity of the resin has been further improved, while keeping the aforementioned various optical properties at favorable levels, and thus, the present polyester carbonate resin has been prepared as a material excellent in moldability.

From the above-described viewpoints, in the polyester carbonate resin of one aspect of the present invention, the content ratio [(I)/(II)] between the constituent unit (I) and the constituent unit (II) is, at a molar ratio, preferably 1/99 to 99/1, more preferably 5/95 to 95/5, further preferably 10/90 to 90/10, still further preferably 15/85 to 85/15, and particularly preferably 20/80 to 80/20.

Besides, from the viewpoint of further improving the properties of a molding material capable of achieving low specific gravity, low birefringence, and reduced photoelastic coefficient, the content ratio [(I)/(II)] between the constituent unit (I) and the constituent unit (II) is, at a molar ratio, more preferably 25/75 or more, further preferably 35/65 or more, still further preferably 45/55 or more, particularly preferably 55/45 or more, and further particularly preferably 65/35 or more.

The polyester carbonate resin of one aspect of the present invention may also comprise constituent units other than the above-described constituent units (I), (II), and (III), within the range that does not impair the effects of the present invention.

However, in the polyester carbonate resin of one aspect of the present invention, from the viewpoint of further improving fluidity, while keeping various types of excellent optical properties at favorable levels, and thereby achieving a molding material excellent in moldability, the total content of the constituent units (I), (II), and (III) is preferably 50 mol % or more, more preferably 60 mol % or more, further preferably 70 mol % or more, still further preferably 80 mol % or more, and particularly preferably 90 mol % or more, based on the total amount (100 mol %) of the constituent units of the resin.

Hereafter, individual constituent units of the polyester carbonate resin of one aspect of the present invention will be described.

<Constituent Unit (I)>

The polyester carbonate resin of the present invention has the constituent unit (I) represented by the above general formula (1). As mentioned above, since the present resin has the constituent unit (I), it can become a resin having a high glass transition temperature, and the present resin can be processed into a molding material capable of providing a molded body having low specific gravity, low birefringence, and reduced photoelastic coefficient.

In the above general formula (1), $R^1$ to $R^3$ each independently represent a hydrogen atom, a methyl group or an ethyl group, and preferably, a hydrogen atom or a methyl group, and more preferably, all of $R^1$ to $R^3$ represent hydrogen atoms.

Besides, the raw material monomer(s) constituting the constituent unit (I) are preferably one or more types selected from compounds represented by the following general formulae (1a) and (1b):

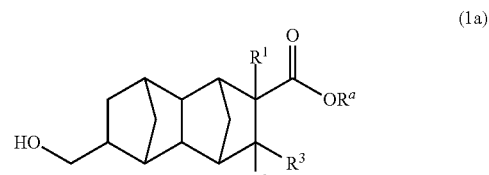
(1a)

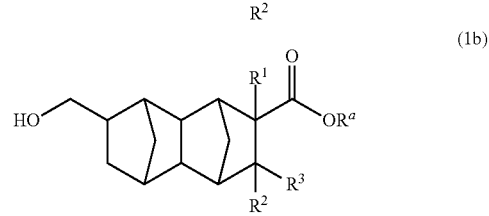
(1b)

In the above general formulae (1a) and (1b), $R^1$ to $R^3$ are as defined in the above general formula (1), and preferred aspects thereof are also as described above.

$R^a$ represents an alkyl group containing 1 to 4 carbon atoms, and examples of the alkyl group containing 1 to 4 carbon atoms may include a methyl group, an ethyl group, an n-propyl group, an isopropyl group, an n-butyl group, an isobutyl group a sec-butyl group, and a t-butyl group.

In one aspect of the present invention, the constituent unit (I) preferably comprises the constituent unit (Ia) derived from the compound represented by the above general formula (1a) and the constituent unit (Ib) derived from the compound represented by the above general formula (1b).

In this case, the content ratio [(Ia)/(Ib)] between the constituent unit (Ia) and the constituent unit (Ib) is, at a mass ratio, preferably 1/99 to 99/1, more preferably 5/95 to 95/5, further preferably 10/90 to 90/10, and still further preferably 20/80 to 80/20.

In the polyester carbonate resin of one aspect of the present invention, from the viewpoint of obtaining a resin having a high glass transition temperature and achieving a molding material capable of providing a molded body having low specific gravity, low birefringence, and reduced photoelastic coefficient, the content of the constituent unit (I) is preferably 5 mol % or more, more preferably 10 mol % or more, more preferably 20 mol % or more, further preferably 30 mol % or more, still further preferably 40 mol % or more, and particularly preferably 50 mol % or more, based on the total amount (100 mol %) of the constituent units of the resin. On the other hand, from the viewpoint of ensuring the content of the constituent unit (II), achieving favorable fluidity, and obtaining a resin having excellent moldability, the content of the constituent unit (I) is preferably 90 mol % or less, more preferably 85 mol % or less, further preferably 80 mol % or less, and still further preferably 75 mol % or less.

<Constituent Unit (II)>

The polyester carbonate resin of the present invention has the constituent unit (II) represented by the above general formula (2). As mentioned above, since the present resin has the constituent unit (II), it can become a resin having favorable fluidity and excellent moldability.

In the above general formula (2), Q represents a divalent linking group.

The constituent unit (II) is a constituent unit derived from diol, and Q in the formula (2) corresponds to a structural portion of the diol, which is other than the hydroxy groups at both ends.

In one aspect of the present invention, the divalent linking group that can be selected as Q in the formula (2) is preferably a group selected from among an alkylene group containing 1 to 10 carbon atoms, an alicyclic hydrocarbon group containing 3 to 30 ring-forming carbon atoms, an aromatic hydrocarbon groups containing 6 to 30 ring-forming carbon atoms, a heterocyclic group containing 3 to 30 ring-forming atoms, and a divalent linking group formed by combining two or more of these groups with one another.

It is to be noted that the term "ring-forming carbon atoms" means the number of carbon atoms in atoms constituting a ring, in a structure in which atoms bind to one another to form a ring. On the other hand, the term "ring-forming atoms" means the number of atoms constituting a ring, in a structure in which atoms bind to one another to form a ring.

That is, carbon atoms or atoms that do not constitute a ring, or carbon atoms or atoms included in substituents in a case where the ring is substituted with the substituents, are not included in the "ring-forming carbon atoms" and the "ring-forming atoms."

The number of carbon atoms contained in the above-described alkylene group is preferably 1 to 10, more preferably 2 to 8, and further preferably 2 to 5.

Examples of the alkylene group may include a methylene group, an ethylene group, a trimethylene group, a propylene group, a propylidene group, an isopropylidene group, a tetramethylene group, a butylene group, and a 2-methyltrimethylene group.

The alkylene group may be either a linear alkyl group or a branched alkyl group.

In addition, the alkylene group may have a substituent, and examples of the substituent may include a cyclopentyl group, a cyclohexyl group, and a phenyl group.

The number of ring-forming carbon atoms contained in the above-described alicyclic hydrocarbon group is preferably 3 to 30, more preferably 3 to 18, further preferably 3 to 10, and still further preferably 5 or 6.

The alicyclic hydrocarbon group may be a divalent group, in which at least two hydrogen atoms are removed from an alicyclic hydrocarbon compound. Examples of the alicyclic hydrocarbon group may include: cycloalkylene groups such as a 1,2-cyclopropylene group, a 1,2-cyclobutylene group, a 1,3-cyclobutylene group, a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group; and a 2,3-bicyclo[2.2.1]heptylene group, a 2,5-bicyclo[2.2.1]heptylene group, a 2,6-bicyclo[2.2.1]heptylene group, a 1,3-adamantylene group, and a group represented by the following formula (i):

wherein * represents a binding site.

The number of ring-forming carbon atoms contained in the above-described aromatic hydrocarbon group is preferably 6 to 30, more preferably 6 to 18, and further preferably 6 to 12.

The aromatic hydrocarbon group may be a divalent group, in which at least two hydrogen atoms are removed from an aromatic hydrocarbon compound. Examples of the aromatic hydrocarbon group may include a phenylene group, a tolylene group, a xylylene group, a mesitylene group, a cumenylene group, a 1-naphthylene group, a 2-naphthylene group, an anthrasenylene group, a phenanthrylene group, an acenaphthylene group, a phenalenylene group, and a fluorenyl group.

The number of ring-forming atoms contained in the above-described heterocyclic group is preferably 3 to 30, more preferably 5 to 18, and further preferably 5 to 12.

The heterocyclic group may be a divalent group, in which at least two hydrogen atoms are removed from a heterocyclic compound. Examples of the heterocyclic group may include a furanylene group, a thiophenylene group, a pyridylene group, a quinolinylene group, an isoquinolinylene group, a pyrazinylene group, a pyrimidylene group, a naphthylidylene group, a benzofuranylene group, a benzothiophenylene group, an indolylene group, a dibenzofuranylene group, a dibenzothiophenylene group, and a carbazolylene group.

It is to be noted that the above-described alicyclic hydrocarbon group, the above-described aromatic hydrocarbon group, and the above-described heterocyclic group may have a substituent. Examples of the substituent may include alkyl groups containing 1 to 4 carbon atoms, halogen atoms (a fluorine atom, a chlorine atom, a bromine atom, and an iodine atom), cyclohexyl groups, phenyl groups, and naphthyl groups.

Since the substituent is not a group that plays a role with a linking group, it does not bind to the oxygen atom in the above general formula (2).

Besides, the linking group that can be selected as Q in the formula (2) may also be a divalent linking group, in which two or more type of the aforementioned alkylene group, alicyclic hydrocarbon group, aromatic hydrocarbon group, and heterocyclic group are combined with one another.

Examples of such a divalent linking group, in which such two or more types of groups are combined with one another, may include the following aspects (1) to (10):

(1): -(alkylene group)-(alicyclic hydrocarbon group)-(alkylene group)-, (2): -(alkylene group)-(aromatic hydrocarbon group)-(alkylene group)-, (3): -(alkylene group)-(heterocyclic group)-(alkylene group)-, (4): -(alicyclic hydrocarbon group)-(alkylene group)-(alicyclic hydrocarbon group)-, (5): -(aromatic hydrocarbon group)-(alkylene group)-(aromatic hydrocarbon group)-, (6): -(heterocyclic group)-(alkylene group)-(heterocyclic group)-, (7): -(alkylene group)-(alicyclic hydrocarbon group)-(alkylene group)-(alicyclic hydrocarbon group)-(alkylene group)-,
(8): -(alkylene group)-(aromatic hydrocarbon group)-(alkylene group)-(aromatic hydrocarbon group)-(alkylene group)-,
(9): -(alkylene group)-(heterocyclic group)-(alkylene group)-(heterocyclic group)-(alkylene group)-, and
(10): a group represented by the following general formula (ii):

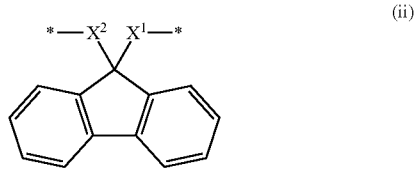

(ii)

wherein $X^1$ and $X^2$ each independently represent an alkylene group containing 1 to 10 carbon atoms, a cycloalkylene group containing 3 to 12 carbon atoms, or an arylene group containing 6 to 12 carbon atoms, and more preferably, represent a methylene group, an ethylene group, or a phenylene group.

In one aspect of the present invention, Q in the formula (2) is preferably a divalent linking group represented by any of the following formulae (a) to (c):

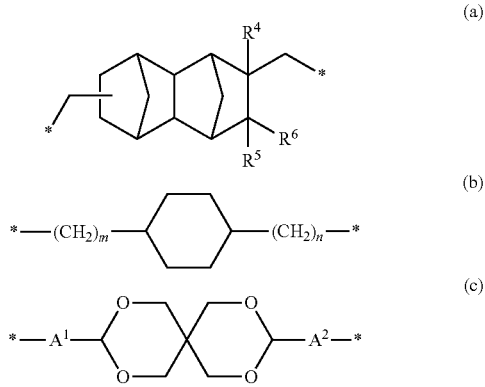

In the above formulae, * represents a binding site.
$R^4$ to $R^6$ in the formula (a) each independently represent a hydrogen atom or an alkyl group containing 1 to 6 carbon atoms.

Examples of the alkyl group may include a methyl group, an ethyl group, an n-propyl group, an isopropyl group, an n-butyl group, an isobutyl group, a sec-butyl group, a t-butyl group, a heptyl group, and a hexyl group.

$R^4$ to $R^6$ in the formula (a) each independently represent preferably a hydrogen atom, a methyl group or an ethyl group, and more preferably a hydrogen atom or a methyl group, and further preferably, all of them are hydrogen atoms. Besides, the alkyl group may be either a linear alkyl group or a branched alkyl group.

In the formula (b), m and n each independently represent an integer of 0 to 4, preferably an integer of 1 to 3, more preferably an integer of 1 or 2, and further preferably 1.

$A^1$ and $A^2$ in the formula (c) each independently represent an alkylene group containing 1 to 10 carbon atoms (preferably 1 to 6, and more preferably 1 to 4 carbon atoms).

Examples of the alkylene group may include a methylene group, an ethylene group, a trimethylene group, a propylene group, a propylidene group, an isopropylidene group, a tetramethylene group, a butylene group, and a 2-methyltrimethylene group.

In the polyester carbonate resin of one aspect of the present invention, the constituent unit (II) preferably comprises a constituent unit (II-A) represented by the following general formula (2-a):

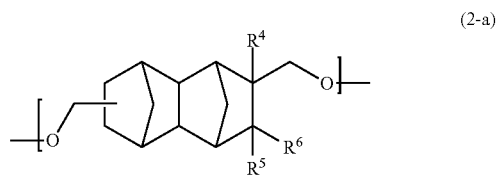

(2-a)

wherein $R^4$ to $R^6$ each independently represent a hydrogen atom or an alkyl group containing 1 to 6 carbon atoms, preferably a hydrogen atom, a methyl group or an ethyl group, and more preferably a hydrogen atom or a methyl group, and further preferably, all of them are hydrogen atoms.

The constituent unit (II-A) is a constituent unit in a case where Q is a divalent linking group represented by the above formula (a).

Moreover, in the polyester carbonate resin of one aspect of the present invention, the constituent unit (II) preferably comprises a constituent unit (II-B) represented by the following general formula (2-b):

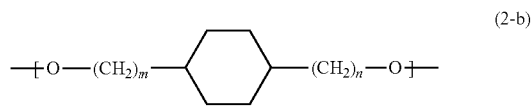

(2-b)

wherein m and n each independently represent an integer of 0 to 4, preferably an integer of 1 to 3, more preferably an integer of 1 or 2, and further preferably 1.

The constituent unit (II-B) is a constituent unit in a case where Q is a divalent linking group represented by the above formula (b).

Furthermore, in the polyester carbonate resin of one aspect of the present invention, the constituent unit (II) preferably comprises a constituent unit (II-C) represented by the following general formula (2-c):

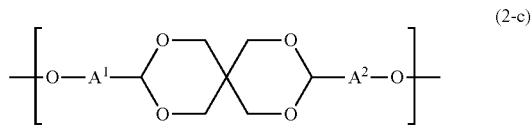

(2-c)

wherein $A^1$ and $A^2$ each independently represent an alkylene group containing 1 to 10 carbon atoms (preferably 1 to 6, and more preferably 1 to 4 carbon atoms).

The constituent unit (II-C) is a constituent unit in a case where Q is a divalent linking group represented by the above formula (c).

Examples of the diol that constitutes the constituent unit (II) may include ethylene glycol, 1,2-propanediol, 1,3-propanediol, 1,4-butanediol, 1,2-butanediol, 1,3-butanediol, neopentyl glycol, 1,5-pentanediol, 1,6-hexanediol, diethylene glycol, triethylene glycol, polyethylene glycol, polypropylene glycol, cyclohexanedimethanol, tricyclodecanedimethanol, pentacyclopentadecanedimethanol, 2,2,4,4-tetramethyl-1,3-cyclobutanediol, hydrogenated bisphenol A, spiroglycol, isosorbide, bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, bisphenol Z, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, and 9,9-bis(4-(2-hydroxyethoxy)-3-cyclohexylphenyl)fluorene, 9,9-bis(4-(2-hydroxyethoxy)-3-phenylphenyl)fluorene.

In addition, when Q in the above general formula (2) is a divalent linking group represented by any of the above formulae (a) to (c), compounds represented by the following formulae (a-1) to (c-1) may be used as diols:

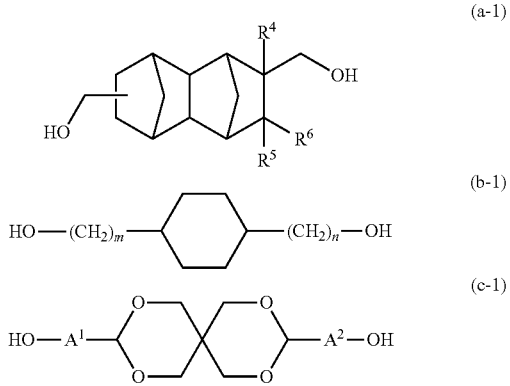

wherein, in the above formulae (a-1) to (c-1), $R^4$ to $R^6$, m, n, $A^1$ and $A^2$ are as defined in the above formulae (a) to (c).

It is to be noted that the diol represented by the above general formula (a-1) is preferably a mixture of a compound represented by the following general formula (a-α) and a compound represented by the following general formula (a-β):

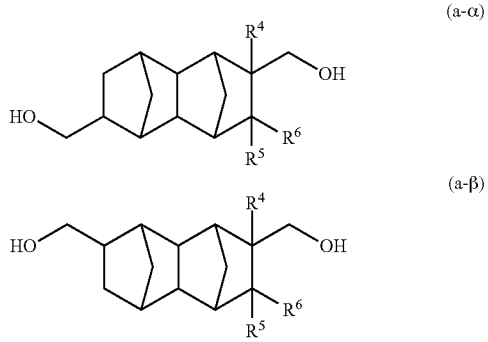

wherein, in the above general formula (a-α) and (a-β), $R^4$ to $R^6$ are as defined in the above formula (a).

In the polyester carbonate resin of one aspect of the present invention, the content ratio [(α)/(β)] between a constituent unit (α) derived from the diol represented by the above general formula (a-α) and a constituent unit (β) derived from the diol represented by the above general formula (a-β) is, at a mass ratio, preferably 1/99 to 99/1, more preferably 5/95 to 95/5, further preferably 10/90 to 90/10, and still further preferably 20/80 to 80/20.

In the polyester carbonate resin of one aspect of the present invention, from the viewpoint of achieving favorable fluidity and obtaining a resin having excellent moldability, the content of the constituent unit (II) is preferably 5 mol % or more, more preferably 10 mol % or more, further preferably 15 mol % or more, still further preferably 20 mol % or more, and particularly preferably 25 mol % or more, based on the total amount (100 mol %) of the constituent units of the resin. On the other hand, from the viewpoint of ensuring the content of the constituent unit (I), and obtaining a resin having a high glass transition temperature and achieving a molding material capable of providing a molded body having low specific gravity, low birefringence, and reduced photoelastic coefficient, the content of the constituent unit (II) is preferably 50 mol % or less, more preferably 45 mol % or less, further preferably 40 mol % or less, and still further preferably 35 mol % or less.

<Constituent Unit (III)>

The polyester carbonate resin of the present invention has the constituent unit (III) represented by the above general formula (3). The constituent unit (III) is introduced as a linking structure, for example, between the constituent unit (I) and the constituent unit (II), or between the two constituent units (II), so as to form a carbonate structure (—O—(C═O)—O—).

The constituent unit (III) is a unit derived from phosgene (carbonyl chloride) or carbonic acid diester.

Examples of the carbonic acid diester may include diphenyl carbonate, ditolyl carbonate, bis(chlorophenyl) carbonate, m-cresyl carbonate, dimethyl carbonate, diethyl carbonate, dibutyl carbonate, and dicyclohexyl carbonate. Among these, from the viewpoint of reactivity and the purity of the obtained resin, diphenyl carbonate is preferable.

In the polyester carbonate resin of one aspect of the present invention, the content of the constituent unit (III) is preferably 5% to 60 mol %, more preferably 10% to 50 mol %, and further preferably 15% to 45 mol %, based on the total amount (100 mol %) of the constituent units of the resin.

<Other Constituent Units>

The polyester carbonate resin of one aspect of the present invention may comprise constituent units other than the above-described constituent units (I), (II), and (III), within the range that does not impair the effects of the present invention.

The polyester carbonate resin of one aspect of the present invention may have, as another constituent unit, a constituent unit (IV) represented by the following general formula (4) (provided that those corresponding to the constituent unit (I) are excluded):

wherein Y represents a hydrocarbon group containing 2 to 30 carbon atoms.

The constituent unit represented by the above general formula (4) is a unit derived from a monomer represented by the following general formula (4a) (provided that the compound represented by the above general formula (1a) or (1b) is excluded):

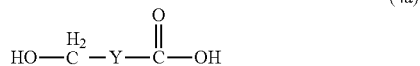
(4a)

wherein Y is as defined in the above general formula (4).

Examples of the hydrocarbon group containing 2 to 30 carbon atoms that can be selected as Q in the above general formulae (4) and (4a) may include: linear or branched alkylene groups containing 2 to 30 carbon atoms, such as an ethylene group, a propylene group, an isopropylene group, a 1,4-butylene group, a 1,3-butylene group, a tetramethylene group, a 1,5-pentylene group, a 1,4-pentylene group, a 1,3-pentylene group, a 2-ethyl-2-methyltrimethylene group, a heptamethylene group, a 2-methyl-2-propyltrimethylene group, a 2,2-diethyltrimethylene group, an octamethylene group, a nonamethylene group, and a decamethylene group; cycloalkylene groups containing 3 to 30 carbon atoms, such as a cyclopropylene group, a cyclobutylene group, a cyclopentylene group, a cyclohexylene group, a cyclooctylene group, a cyclodecylene group, and a 1,3-adamantyl group; arylene groups containing 6 to 30 carbon atoms, such as phenylene groups including a 1,2-phenylene group, a 1,3-phenylene group and a 1,4-phenylene group, a biphenylene group, a naphthylene group, a divalent group having a phenanthrene structure, and a divalent group having a fluorene structure; and a group represented by a general formula (4b) as shown below.

Besides, these groups may be further substituted with substituents, and examples of such substituents may include an alkyl group containing 1 to 6 carbon atoms, a cycloalkyl group containing 3 to 12 carbon atoms, and an aryl group containing 6 to 12 carbon atoms.

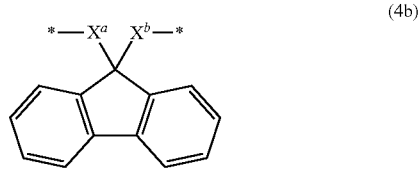
(4b)

wherein $X^a$ and $X^b$ each independently represent a hydrocarbon group containing 1 to 12 carbon atoms, and * represents a binding site.

Examples of the hydrocarbon group may include a linear or branched alkylene group containing 1 to 12 carbon atoms, a cycloalkylene group containing 3 to 12 carbon atoms, and an arylene group containing 6 to 12 carbon atoms. The hydrocarbon group is preferably a linear alkylene group containing 1 to 12 carbon atoms or an arylene group containing 6 to 12 carbon atoms, and is more preferably a methylene group, an ethylene group, or a phenylene group.

In the polyester carbonate resin of one aspect of the present invention, the content of the constituent unit derived from dicarboxylic acid is preferably less than 10 mol %, more preferably less than 5 mol %, and further preferably less than 1 mol %, based on the total amount (100 mol %) of the constituent units of the polyester carbonate resin.

[Method for Producing Polyester Carbonate Resin]

The polyester carbonate resin of one aspect of the present invention can be produced according to a melt polycondensation method, using, as raw materials, the compound represented by the above general formula (1a) or (Ib) serving as a raw material monomer of the constituent unit (I), a diol serving as a raw material monomer of the constituent unit (II), and phosgene (carbonyl chloride) or carbonic acid diester serving as a raw material monomer of the constituent unit (III), as well as other monomers.

Examples of such other monomers may include the monomer represented by the above general formula (4a) that constitutes the constituent unit (IV), and dicarboxylic acid.

The amount of the carbonic acid diester mixed is preferably 0.70 to 1.30 moles, and more preferably 0.90 to 1.10 moles, based on the total amount (1 mole) of the diol component and the dicarboxylic acid component.

Examples of a polycondensation catalyst used in the melt polycondensation method may include a basic compound catalyst, a transesterification catalyst, and a mixed catalyst of these catalysts.

Examples of the basic compound catalyst may include an alkali metal compound, an alkaline-earth metal compound, and a nitrogen-containing compound.

Examples of the alkali metal compound may include the organic acid salts, inorganic salts, oxides, hydroxides, hydrides or alkoxides of alkali metals. Among these, from the viewpoints of catalytic effects, costs, distribution amount, the influence of the resin on hue, etc., sodium carbonate and sodium hydrogen carbonate are preferable.

Examples of the alkaline-earth metal compound may include the organic acid salts, inorganic salts, oxides, hydroxides, hydrides or alkoxides of the alkaline-earth metal compounds.

Examples of the nitrogen-containing compound may include quaternary ammonium hydroxides and the salts thereof, and amines.

As transesterification catalysts, the salts of metals selected from zinc, tin, zirconium, and lead are preferably used. These catalysts may be used alone or may also be used in combination of two or more types. In addition, the transesterification catalyst may also be used in combination with the aforementioned alkali metal compound or alkaline-earth metal compound.

Examples of the specific transesterification catalyst may include metal compounds comprising metal atoms such as zinc, lead, cerium, cadmium, manganese, cobalt, lithium, sodium potassium calcium, nickel, magnesium, vanadium, aluminum titanium, antimony, germanium, and tin (the aspect of the metal compound may include, for example, fatty acid salt, carbonate, phosphate, hydroxide, chloride, oxide, and alkoxide) and magnesium metal.

These transesterification catalysts may be used alone or may also be used in combination of two or more types.

Among these, as transesterification catalysts, metal compounds comprising metal atoms selected from manganese, cobalt, zinc, titanium, calcium, antimony, germanium and tin are preferable, and metal compounds comprising metal atoms selected from manganese, titanium, antimony, germanium and tin are more preferable.

The catalyst is used in an amount of preferably $1 \times 10^{-9}$ to $1 \times 10^{-3}$ moles, and more preferably $1 \times 10^{-7}$ to $1 \times 10^{-7}$ moles, based on the total amount (1 mole) of the compound represented by the above general formula (1a) or (1b) serving as a raw material monomer of the constituent unit (I).

In the melt polycondensation method, melt polycondensation is carried out according to a transesterification reaction using the above-described raw materials and catalysts, under heating and under normal or reduced pressure, while removing by-products.

Specifically, the raw materials are preferably reacted at a reaction temperature of 120° C. to 260° C. (preferably, 180° C. to 260° C.) for a reaction time of 0.1 to 5 hours (preferably, 0.5 to 3 hours).

Subsequently, the reaction temperature is increased while the degree of pressure reduction in the reaction system is increased, so that a diol compound is allowed to react with other monomers, and finally, the polycondensation reaction is preferably carried out under a reduced pressure of 1 mmHg or less at a temperature of 200° C. to 350° C. for 0.05 to 2 hours.

Such a reaction may be carried out either in a continuous system or in a batch system.

The reaction apparatus used to perform the above-described reaction may be a vertical reaction apparatus equipped with an anchor-type impeller, a max-blend impeller, a helical ribbon-type impeller, etc., or a horizontal reaction apparatus equipped with paddle blades, lattice blades, glasses blades, etc., or further, an extruder-type reaction apparatus equipped with a screw, etc. Moreover, a reaction apparatus prepared by appropriately combining the aforementioned reaction apparatuses with one another, while considering the viscosity of a polymer, is preferably used.

In the method for producing the polyester carbonate resin of one aspect of the present invention, from the viewpoint of maintaining heat stability and hydrolytic stability, after completion of the polymerization reaction, the catalyst may be removed or deactivated.

In general, a method of deactivating a catalyst by addition of a known acidic substance is carried out.

Examples of the acidic substance that deactivates a catalyst may include: esters such as butyl benzoate; aromatic sulfonic acids such as p-toluenesulfonic acid; aromatic sulfonic acid esters, such as butyl p-toluenesulfonate and hexyl p-toluenesulfonate; phosphoric acids, such as phosphorous acid, phosphoric acid, and phosphonic acid; phosphorous acid esters, such as triphenyl phosphite, monophenyl phosphite, diphenyl phosphite, diethyl phosphite, di-n-propyl phosphite, di-n-butyl phosphite, di-n-hexyl phosphite, dioctyl phosphite, and monooctyl phosphite; phosphoric acid esters, such as triphenyl phosphate, diphenyl phosphate, monophenyl phosphate, dibutyl phosphate, dioctyl phosphate, and monooctyl phosphate; phosphonic acids, such as diphenyl phosphonate, dioctyl phosphonate, and dibutyl phosphonate; phosphonic acid esters such as diethyl phenyl phosphonate; phosphines, such as triphenylphosphine and bis(diphenylphosphino)ethane; boric acids, such as boric acid and phenyl borate; aromatic sulfonates, such as tetrabutylphosphonium dodecylbenzenesulfonate; organic halides, such as chloride stearate, benzoyl chloride, and p-toluenesulfonyl chloride; alkyl sulfates such as dimethyl sulfonate; and organic halogenates such as benzyl chloride.

Among these acidic substances, from the viewpoints of deactivating effects, and the hue and stability of the resin, butyl p-toluenesulfonate is preferably used.

In addition, such an acidic substance that deactivates a catalyst is used in an amount of preferably 0.01 to 50 moles, and preferably 0.3 to 20 moles, based on 1 mole of the catalyst.

After deactivation of the catalyst, in order to eliminate a low-boiling-point compound from the resin, a step of devolatilizing and removing such a low-boiling-point compound from the resin at a pressure of 0.1 to 1 mmHg and at a temperature of 200° C. to 350° C. may be established. In this step, a horizontal apparatus equipped with stirring blades having excellent surface renewal ability, such as paddle blades, lattice blades or glasses blades, or a thin film evaporator is preferably used.

Since the thus obtained resin is desired to contain a foreign matter in an amount as small as possible, filtration of melted raw materials and filtration of a catalyst solution are preferably carried out.

The thickness of a filter mesh used in the filtration is preferably 5 µm or less, and more preferably 1 µm or less.

Moreover, filtration of the generated resin through a polymer filter is preferably carried out.

The thickness of the polymer filter mesh is preferably 100 µm or less, and more preferably 30 µm or less. Furthermore, a step of collecting resin pellets must be naturally performed under a low-dust environment, and the class is preferably 1000 or less, and more preferably 100 or less.

[Physical properties of polyester carbonate resin]

The weight average molecular weight (Mw) of the polyester carbonate resin of one aspect of the present invention is preferably 5,000 to 50,000, more preferably 7,000 to 45,000, further preferably 10,000 to 40,000, and still further preferably 15,000 to 35,000.

In the present description, the weight average molecular weight (Mw) is a value relative to standard polystyrene that is measured according to a gel permeation chromatography (GPC) method, and specifically, it means a value measured according to the method described in Examples.

The glass transition temperature (Tg) of the polyester carbonate resin of one aspect of the present invention is preferably 135° C. or higher, more preferably 138° C. or higher, further preferably 140° C. or higher, still further preferably 142° C. or higher, and particularly preferably 145° C. or higher. On the other hand, the glass transition temperature (Tg) is preferably 180° C. or lower, and more preferably 170° C. or lower.

In the present description, the glass transition temperature (Tg) of the resin is a value measured in accordance with JIS K7121-1987, using a differential scanning calorimeter (DSC), and specifically, it means a value measured according to the method described in Examples.

From the viewpoint of obtaining a resin having excellent moldability, the melt volume rate (MVR) of the polyester carbonate resin of one aspect of the present invention that is measured at 260° C. and at a load of 2.16 kg is preferably 10 to 100 $cm^3$/10 min, more preferably 20 to 90 $cm^3$/10 min, further preferably 30 to 80 $cm^3$/10 min, still further preferably 40 to 75 $cm^3$/10 min, and particularly preferably 45 to 70 $cm^3$/10 min.

In the present description, the melt volume rate (MVR) of the resin is a value measured in accordance with JIS K7210, at 260° C. and at a load of 2.16 kg, and specifically, it means a value measured according to the method described in Examples.

The polyester carbonate resin of one aspect of the present invention can be used to produce a molded body having more excellent optical properties, and the present polyester carbonate resin may become a material for forming a molded body having, for example, low birefringence, low specific gravity, and reduced photoelastic coefficient.

The refractive index of a molded body formed by molding the polyester carbonate resin of one aspect of the present invention is preferably 1.50 to 1.65, more preferably 1.51 to 1.60, further preferably 1.52 to 1.58, and still further preferably 1.53 to 1.56.

In the present description, the refractive index means a value measured in accordance with JIS K7142.

The specific gravity of a molded body formed by molding the polyester carbonate resin of one aspect of the present invention is preferably 1.30 or less, more preferably 1.25 or less, and further preferably less than 1.20.

In the present description, the specific gravity means a value measured in accordance with JIS K7112.

The birefringence at 600 nm of a molded body formed by molding the polyester carbonate resin of one aspect of the present invention, which is measured in accordance with the method described in the after-mentioned Examples, is preferably less than 95 nm, more preferably less than 90 nm, further preferably less than 80 nm, still further preferably less than 70 nm, and particularly preferably less than 60 nm.

The photoelastic coefficient of a molded body formed by molding the polyester carbonate resin of one aspect of the present invention is preferably $12\times10^{-12}$ $Pa^{-1}$ or less, more preferably $10\times10^{-12}$ $Pa^{-1}$ or less, further preferably $8\times10^{-12}$ $Pa^{-1}$ or less, and still further preferably $5\times10^{-12}$ $Pa^{-1}$ or less.

In the present description, the photoelastic coefficient means a value measured using an ellipsometer (for example, manufactured by JASCO Corporation; product name: "M-220").

[Molded Body]

The molded body of one aspect of the present invention is formed by molding a resin composition comprising the aforementioned polyester carbonate resin.

The resin composition used as a material for forming the molded body may only consist of the aforementioned polyester carbonate resin, but it may further comprise additives.

In one aspect of the present invention, the content of the polyester carbonate resin is determined, as appropriate, depending on the type of a molded product. The content of the polyester carbonate resin is generally 30% to 100% by mass, preferably 50% to 100% by mass, more preferably 60% to 100% by mass, further preferably 70% to 100% by mass, and still further preferably 80% to 100% by mass, based on the total amount (100% by mass) of the resin composition.

Examples of the above-described additives used in one aspect of the present invention may include an antioxidant, a release agent, a processing stabilizer, an ultraviolet absorber, a fluidity modifier, a crystal nucleating agent, a strengthening agent, a dye, an antistatic agent, a bluing agent, and an antibacterial agent.

These additives may be each used alone as a single type, or may be each used in combination of two or more types.

<Antioxidant>

Examples of the antioxidant used in one aspect of the present invention may include triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocyanamide), 3,5-di-tert-butyl-4-hydroxy-benzylphosphonate-diethyl ester, tris(3,5-di-tert-butyl-4-hydroxybenzyl)isocyanurate, and 3,9-bis{1,1-dimethyl-2-[p-(3-tert-butyl-4-hydroxy-5-methylphenyl)propionyloxy]ethyl}-2,4,8,10-tetraoxaspiro(5,5)undecane.

The content of the antioxidant is preferably 0.01% to 0.50% by mass, more preferably 0.10% to 0.40% by mass, and further preferably 0.20% to 0.40% by mass, based on the total amount (100% by mass) of the resin composition.

<Release Agent>

The release agent used in one aspect of the present invention preferably comprises an ester of alcohol and fatty acid, and more preferably comprises such an ester in an amount of 90% to 100% by mass based on the total amount of the release agent.

Examples of the ester may include an ester of monohydric alcohol and fatty acid, and a partial ester or complete ester of polyhydric alcohol and fatty acid.

The ester of monohydric alcohol and fatty acid, which is used as a release agent, is preferably an ester of monohydric alcohol having 1 to 20 carbon atoms and saturated fatty acid having 10 to 30 carbon atoms.

Specific examples of the ester of monohydric alcohol and saturated fatty acid may include stearyl stearate, palmityl palmitate, butyl stearate, methyl laurate, and isopropyl palmitate.

The partial ester or complete ester of polyhydric alcohol and fatty acid, which is used as a release agent, is preferably a partial ester or complete ester of polyhydric alcohol having 1 to 25 carbon atoms and saturated fatty acid having 10 to 30 carbon atoms.

Specific examples of the partial ester or complete ester of polyhydric alcohol and saturated fatty acid may include partial esters or complete esters of dipentaerythritols, such as stearic acid monoglyceride, stearic acid monoglyceride, stearic acid diglyceride, stearic acid triglyceride, monosorbitate stearate, behenic acid monoglyceride, capric acid monoglyceride, lauric acid monoglyceride, pentaerythritol monostearate, pentaerythritol tetrastearate, pentaerythritol tetrapelargonate, propylene glycol monostearate, biphenyl biphenate, sorbitan monostearate, 2-ethylhexyl stearate, and dipentaerythritol hexastearate.

The content of the release agent is preferably 0.01% to 0.50% by mass, more preferably 0.02% to 0.10% by mass, and further preferably 0.03% to 0.05% by mass, based on the total amount (100% by mass) of the resin composition.

<Processing Stabilizer>

Examples of the processing stabilizer used in one aspect of the present invention may include 2-t-butyl-6-(3-t-butyl-2-hydroxy-5-methylbenzyl)-4-methylphenyl acrylate, 2,4-di-t-butyl-6-[1-(3,5-di-t-butyl-2-hydroxyphenyl)ethyl]phenyl acrylate, 2,4-di-t-amyl-6-[1-(3,5-di-t-amyl-2-hydroxyphenyl)ethyl]phenyl acrylate, 2-t-butyl-6-(3-t-butyl-2-hydroxy-5-methylbenzyl)-4-methylphenyl methacrylate, and 2,4-di-t-amyl-6-[1-(3,5-di-t-amyl-2-hydroxyphenyl)ethyl]phenyl methacrylate.

The content of the processing stabilizer is preferably 0.01% to 3.0% by mass based on the total amount (100% by mass) of the resin composition.

<Ultraviolet Absorber>

Examples of the ultraviolet absorber used in one aspect of the present invention may include benzophenones, benzotriazoles, triazines, benzoates, salicylates, cyanoacrylates, oxalic acid anilides, malonic acid esters, and formamidines.

The content of the ultraviolet absorber is preferably 0.001% to 3.0% by mass based on the total amount (100% by mass) of the resin composition.

<Fluidity Modifier>

Examples of the fluidity modifier used in one aspect of the present invention may include "METABLEN TP-001" and "METABLEN TP-003" (product names; manufactured by MITSUBISHI RAYON CO., LTD.).

The content of the fluidity modifier is preferably 0.01% to 10.0% by mass based on the total amount (100% by mass) of the resin composition.

<Crystal Nucleating Agent>

The crystal nucleating agent used in one aspect of the present invention may be either an inorganic crystal nucleating agent, or an organic crystal nucleating agent.

Examples of the inorganic crystal nucleating agent may include a natural or synthetic silicate compound, titanium oxide, barium sulfate, tricalcium phosphate, calcium carbonate, sodium phosphate, kaolinite, halloysite, talc, smectite, vermulite, and mica.

Examples of the organic crystal nucleating agent may include: amide; organic acid metal salts such as sodium benzoate, aluminum dibenzoate, potassium benzoate, lithium benzoate, sodium β-naphthalate, sodium cyclohexane carboxylate, and zinc phenylphosphonate; and sorbitol derivatives such as 1,3:2,4-bis-O-(4-methylbenzylidene)-D-sorbitol, and nonitol derivatives.

The content of the crystal nucleating agent is preferably 0.01% to 3.0% by mass based on the total amount (100% by mass) of the resin composition.

<Strengthening Agent>

Examples of the strengthening agent used in one aspect of the present invention may include inorganic fibers or organic fibers, such as glass fibers, ceramic fibers, carbon fibers, and metal coated glass fibers. In addition, the surfaces of these fibers may be treated with a silane compound and the like.

The content of the strengthening agent is preferably 0.01% to 3.0% by mass based on the total amount (100% by mass) of the resin composition.

<Dye>

Examples of the dye used in one aspect of the present invention may include a nitroso dye, a nitro dye, an azo dye, a stilbeneazo dye, a ketoimine dye, a triphenylmethane dye, a xanthene dye, an acridine dye, a quinoline dye, a methine/polymethine dye, a thiazole dye, an indamine/indophenol dye, an azine dye, an oxazine dye, a thiazine dye, a sulfur dye, an aminoketone/oxyketone dye, an anthraquinone dye, an indigoid dye, and a phthalocyanine dye.

The content of the dye is preferably 0.001% to 3.0% by mass based on the total amount (100% by mass) of the resin composition.

<Antistatic Agent>

Examples of the antistatic agent used in one aspect of the present invention may include: inorganic antistatic agents such as zinc oxide, titanium oxide, and carbon black; and organic antistatic agents such as a conductive polymer and an organic surfactant.

The content of the antistatic agent is preferably 0.001% to 3.0% by mass based on the total amount (100% by mass) of the resin composition.

<Bluing Agent>

As bluing agents used in one aspect of the present invention, those used together with common polyester carbonate resins can be used. The bluing agent may be, for example, an anthraquinone dye.

The content of the bluing agent is preferably 0.0001% to 0.001% by mass based on the total amount (100% by mass) of the resin composition.

<Antibacterial Agent>

Examples of the antibacterial agent used in one aspect of the present invention may include: organic antibacterial agents, such as a chlorinated antibacterial agent, a phenolic antibacterial agent, an imidazole-based antibacterial agent, a thiazole-based antibacterial agent, and a quaternary ammonium-based antibacterial agent; and inorganic antibacterial agents, such as a zeolite-based antibacterial agent comprising a metal such as silver or zinc, an apatite-based antibacterial agent, a silicaalumina-based antibacterial agent, a ceramic antibacterial agent, a zirconium phosphate-based antibacterial agent, a silica gel-based antibacterial agent, a hydroxyapatite-based antibacterial agent, and a calcium silicate-based antibacterial agent.

The content of the antibacterial agent is preferably 0.01% to 3.0% by mass based on the total amount (100% by mass) of the resin composition.

In the present resin composition, phenolic components generated upon the production of the resin composition and monomer components that have not reacted and have remained, may be present as impurities, together with the aforementioned polyester carbonate resin.

The content of the phenolic components in the resin composition is preferably 0.1 to 3000 ppm by mass, more preferably 0.1 to 2000 ppm by mass, more preferably 1 to 1000 ppm by mass, further preferably 1 to 800 ppm by mass, still further preferably 1 to 500 ppm by mass, and even further preferably 1 to 300 ppm by mass, based on the total amount (100% by mass) of the resin composition.

On the other hand, the content of the raw material monomers in the resin composition is preferably 0.1 to 3000 ppm by mass, more preferably 0.1 to 1000 ppm by mass, and further preferably 1 to 500 ppm by mass, based on the total amount (100% by mass) of the resin composition.

The molded body of one aspect of the present invention can be obtained by injection molding a resin composition comprising a polyester carbonate resin into a desired shape, using an injection molding machine or an injection compression molding machine. Molding conditions for the injection molding are determined, as appropriate, depending on the intended use or shape of the molded body. The molding temperature is preferably set at 180° C. to 280° C., and the injection pressure is preferably set at 50 to 1700 kg/cm$^2$.

Since the molded body of one aspect of the present invention has excellent optical properties, it is preferably used as an optical member.

Examples of the optical member may include a film, a prism, and an optical lens. In particular, an optical lens is preferable.

In order to avoid, as much as possible, the mixing of foreign matters into the optical lens, the molding environment must be naturally a low-dust environment, and the class is preferably 1000 or less, and more preferably 100 or less.

The optical lens of one aspect of the present invention is preferably used in the shape of an aspherical lens, as necessary. Since the aspherical lens can reduce spherical aberration to substantially zero with a single lens thereof, it is not necessary to eliminate the spherical aberration by a combination of a plurality of spherical lenses, and thereby, it becomes possible to achieve weight saving and a reduction in production costs. Therefore, among the optical lenses, the aspherical lens is particularly useful as a camera lens. The astigmatism of the aspherical lens is preferably 0 to 15 mλ, and more preferably 0 to 10 mλ.

The thickness of the optical lens of one aspect of the present invention can be set to be in a wide range depending on intended use, and is not particularly limited. The thickness of the present optical lens is preferably 0.01 to 30 mm, and more preferably 0.1 to 15 mm.

An antireflection layer may be established on the surface of the optical lens of one aspect of the present invention, as necessary.

The antireflection layer may be either a single layer or a multilayer.

In addition, the antireflection layer may be formed from an organic matter, or may also be formed from an inorganic matter. The antireflection layer is preferably formed from an inorganic matter.

Examples of the inorganic matter that forms the antireflection layer may include oxides or fluorides, such as silicon oxide, aluminum oxide, zirconium oxide, titanium oxide, cerium oxide, magnesium oxide, or magnesium fluoride.

Among these, silicon oxide and zirconium oxide are preferable, and a combined use of silicon oxide and zirconium oxide is more preferable.

Moreover, the antireflection layer is not particularly limited in terms of a combination of a single layer/a multilayer, components constituting the layers, a combination of the thicknesses of the layers, etc. Two-layer configuration or three-layer configuration is preferable, and three-layer configuration is particularly preferable. Furthermore, it is preferable that the antireflection layer as a whole may be formed to result in a thickness that is 0.00017% to 3.3%, based on the thickness of the optical lens, and specifically, a thickness of 0.05 to 3 μm, and particularly preferably 1 to 2 μm.

EXAMPLES

Hereinafter, the present invention will be more specifically described in the following examples. However, these examples are not intended to limit the scope of the present invention. It is to be noted that the measurement values described in the examples were obtained by applying the following methods or apparatuses.

(1) Weight Average Molecular Weight (Mw)

Gel permeation chromatography (GPC) was adopted, tetrahydrofuran was used as a developing solvent, and a calibration curve was produced using standard polystyrene whose molecular weight had been known (molecular weight distribution=1). Based on this calibration curve, the weight average molecular weight (Mw) was calculated from the retention time of GPC.

(2) Glass Transition Temperature (Tg)

The glass transition temperature (Tg) was measured in accordance with JIS K7121-1987, using a differential scanning calorimeter (DSC).

(3) Melt Volume Rate (MVR)

The melt volume rate (MVR) was measured in accordance with JIS K7210, at 260° C. at a load of 2.16 kg, using MELT INDEXER (manufactured by TOYO SEIKI CO., LTD.).

(4) Refractive Index Nd

The resin used as a measurement target was press-molded into a disk having a diameter of 40 mm and a thickness of 3 mm (molding conditions: 200° C., 100 kgf/cm², and 2 minutes), and was then cut at a right angle to obtain a test piece. The obtained test piece was then measured using a precision refractometer (manufactured by Shimadzu Corporation; product name: "KPR-200").

(5) Specific Gravity

The specific gravity of the test piece (molded body) used in the measurement of the refractive index nd in (4) above was measured in accordance with JIS K7112, using an electronic hydrometer (manufactured by ALFAMiRAGE; product name: "electronic hydrometer SD-200L").

(6) Birefringence

The resin used as a measurement target was molded into a film having a thickness of 100 μm, which was then subjected to uniaxial extension to an extension magnification of 1.5 times at the glass transition temperature (Tg) of the resin+20° C. Thereafter, the phase difference at 600 nm was measured using an ellipsometer (manufactured by JASCO Corporation; product name "M-220"), and the value of birefringence was then obtained.

(7) Photoelastic Coefficient

The resin used as a measurement target was molded into a film having a thickness of 100 μm, and the photoelastic coefficient was then measured using an ellipsometer (manufactured by JASCO Corporation; product name "M-220").

The following abbreviations of compounds are used in the following description.

D-NHEs: Decahydro-1,4:5,8-dimethanonaphthalene-2-methoxycarbonyl-6(7)-methanol, the compound represented by the above general formula (1a) or (1b) (wherein, in each formula, $R^1$ to $R^3$ represent hydrogen atoms, and $R^a$ represents a methyl group).

D-NDM: Decahydro-1,4:5,8-dimethanonaphthalenedimethanol, the compound represented by the above general formula (a-1) (wherein $R^4$ to $R^6$ represent hydrogen atoms).

BPA: 2,2'-Bis(4-hydroxyphenyl)propane

CHDM: 1,4-Cyclohexanedimethanol, the compound represented by the above general formula (b-1) (wherein m and n represent 1).

SPG: β,β,β',β'-tetramethyl-2,4,8,10-tetraoxaspiro[5,5]undecane-3,9-diethanol (spiroglycol), the compound represented by the above general formula (c-1) (wherein $A^1$ and $A^2$ represent ethylene groups).

EG: Ethylene glycol

DPC: Diphenyl carbonate

DMT: Dimethyl terephthalate

CHDA: 1,4-Cyclohexanedicarboxylic acid

Example 1

D-NHEs (56.14 g; 0.224 mol), D-NDM (199.30 g; 0.896 mol), diphenyl carbonate (DPC) (192.24 g; 0.897 mol), and titanium tetrabutoxide (38.6 mg; 11.3×10⁵ mol) were each added into a 500 mL reactor equipped with a stirrer and a distillation apparatus. Thereafter, nitrogen gas was introduced into the reaction system, and the obtained mixture was then heated to 180° C. in a nitrogen atmosphere at a pressure of 101.3 kPa over 1 hour, while stirring. After the temperature had reached 180° C., the pressure was reduced to 40 kPa over 30 minutes. At the same time, the temperature was increased to 255° C. over 2 hours after initiation of the pressure reduction. When the distilled methanol and the distilled phenol became 60%, the pressure was further reduced to 0.133 kPa or less over 1 hour. Thereafter, the reaction mixture was retained at a pressure of 0.133 kPa or less for 30 minutes to obtain a polyester carbonate resin (1).

The physical properties of the polyester carbonate resin (1) were as follows: Mw: 31,000, Tg: 141° C., MVR: 38 cm³/10 min, refractive index nd: 1.532, specific gravity: 1.19, birefringence: 88 nm, and photoelastic coefficient: $6 \times 10^{-12}$ Pa⁻¹.

Example 2

D-NHEs (89.44 g; 0.357 mol), D-NDM (185.32 g; 0.834 mol), diphenyl carbonate (DPC) (178.75 g; 0.834 mol), and titanium tetrabutoxide (20.2 mg; 5.9×10⁻⁵ mol) were each added into a 500 mL reactor equipped with a stirrer and a distillation apparatus. The same operations as those in Example 1 were performed on the obtained mixture, so as to obtain a polyester carbonate resin (2).

The physical properties of the polyester carbonate resin (2) were as follows: Mw: 29,000, Tg: 142° C., MVR: 48 cm$^3$/10 min, refractive index nd: 1.534, specific gravity: 1.19, birefringence: 76 nm, and photoelastic coefficient: 5×10$^{-12}$ Pa$^{-1}$.

Example 3

D-NHEs (154.68 g; 0.618 mol), D-NDM (137.36 g; 0.618 mol), diphenyl carbonate (DPC) (134.34 g; 0.627 mol), and titanium tetrabutoxide (20.5 mg; 6.0×10$^5$ mol) were each added into a 500 mL reactor equipped with a stirrer and a distillation apparatus. The same operations as those in Example 1 were performed on the obtained mixture, so as to obtain a polyester carbonate resin (3).

The physical properties of the polyester carbonate resin (3) were as follows: Mw: 29,000, Tg: 145° C., MVR: 52 cm$^3$/10 min, refractive index nd: 1.535, specific gravity: 1.18, birefringence: 65 nm, and photoelastic coefficient: 4×10$^{-12}$ Pa$^{-1}$.

Example 4

D-NHEs (183.02 g; 0.731 mol), D-NDM (108.36 g; 0.487 mol), diphenyl carbonate (105.76 g; 0.494 mol), and titanium tetrabutoxide (20.0 mg; 5.9×10$^{-5}$ mol) were each added into a 500 mL reactor equipped with a stirrer and a distillation apparatus. The same operations as those in Example 1 were performed on the obtained mixture, so as to obtain a polyester carbonate resin (4).

The physical properties of the polyester carbonate resin (4) were as follows: Mw: 30,000, Tg: 149° C., MVR: 44 cm$^3$/10 min, refractive index nd: 1.535, specific gravity: 1.18, birefringence: 55 nm, and photoelastic coefficient: 4×10$^{-12}$ Pa$^{-1}$.

Example 5

D-NHEs (247.72 g; 0.990 mol), D-NDM (55.00 g; 0.247 mol), diphenyl carbonate (DPC) (53.70 g; 0.251 mol), and titanium tetrabutoxide (30.0 mg; 8.8×10$^5$ mol) were each added into a 500 mL reactor equipped with a stirrer and a distillation apparatus. The same operations as those in Example 1 were performed on the obtained mixture, so as to obtain a polyester carbonate resin (5).

The physical properties of the polyester carbonate resin (5) were as follows: Mw: 27,000, Tg: 156° C., MVR: 36 cm$^3$/10 min, refractive index nd: 1.535, specific gravity: 1.17, birefringence: 45 nm, and photoelastic coefficient: 3×10$^{-2}$ Pa$^{-1}$.

Example 6

D-NHEs (277.75 g; 1.109 mol), CHDM (40.00 g; 0.277 mol), diphenyl carbonate (DPC) (59.50 g; 0.278 mol), and titanium tetrabutoxide (31.0 mg; 9.1×10$^{-5}$ mol) were each added into a 500 mL reactor equipped with a stirrer and a distillation apparatus. The same operations as those in Example 1 were performed on the obtained mixture, so as to obtain a polyester carbonate resin (6).

The physical properties of the polyester carbonate resin (6) were as follows: Mw: 29,000, Tg: 140° C., MVR: 40 cm$^3$/10 min, refractive index nd: 1.530, specific gravity: 1.19, birefringence: 38 nm, and photoelastic coefficient: 7×10$^{-2}$ Pa$^{-1}$.

Example 7

D-NHEs (230.50 g; 0.921 mol), SPG (71.00 g; 0.230 mol), diphenyl carbonate (DPC) (50.00 g; 0.233 mol), and titanium tetrabutoxide (30.0 mg; 8.8×10$^{-5}$ mol) were each added into a 500 mL reactor equipped with a stirrer and a distillation apparatus. The same operations as those in Example 1 were performed on the obtained mixture, so as to obtain a polyester carbonate resin (7).

The physical properties of the polyester carbonate resin (7) were as follows: Mw: 26,000, Tg: 145° C., MVR: 38 cm$^3$/10 min, refractive index nd: 1.522, specific gravity: 1.18, birefringence: 40 nm, and photoelastic coefficient: 2×10$^{-12}$ Pa$^{-1}$.

Comparative Example 1

D-NDM (250.00 g; 1.124 mol), diphenyl carbonate (DPC) (243.50 g; 1.137 mol), and sodium hydrogen carbonate (0.8 mg; 9.9×10$^{-6}$ mol) were each added into a 500 mL reactor equipped with a stirrer and a distillation apparatus. Thereafter, nitrogen gas was introduced into the reaction system, and the obtained mixture was then heated to 215° C. in a nitrogen atmosphere at a pressure of 101.3 kPa over 1 hour, while stirring. Thereafter, the reactor was placed in an oil bath, and was then heated at 200° C. to initiate a transesterification reaction.

Stirring was initiated 5 minutes after initiation of the reaction, and then, 20 minutes after initiation of the reaction, the pressure was reduced from 101.3 kPa to 26.7 kPa over 10 minutes. In addition, during this pressure reduction, the reaction mixture was heated to 210° C.

Seventy minutes after initiation of the reaction, the temperature was further increased to 220° C., and then, 80 minutes after initiation of the reaction, the pressure was reduced from 26.7 kPa to 20.0 kPa over 30 minutes. After that, the temperature was increased to 240° C., and the reaction mixture was retained for 10 minutes in a state in which the pressure was further reduced to 0.133 kPa, so as to obtain a polycarbonate resin (i).

The physical properties of the polycarbonate resin (i) were as follows: Mw: 32,000, Tg: 133° C., MVR: 30 cm$^3$/10 min, refractive index nd: 1.531, specific gravity: 1.20, birefringence: 100 nm, and photoelastic coefficient: 8×10$^{-2}$ Pa$^{-1}$.

Comparative Example 2

BPA (255.00 g; 1.117 mol), diphenyl carbonate (DPC) (245.00 g; 1.144 mol), and sodium hydrogen carbonate (0.8 mg; 9.9×10$^{-6}$ mol) were each added into a 500 mL reactor equipped with a stirrer and a distillation apparatus. The same operations as those in Comparative Example 1 were performed on the obtained mixture, so as to obtain a polycarbonate resin (ii).

The physical properties of the polycarbonate resin (ii) were as follows: Mw: 33,000, Tg: 143° C., MVR: 33 cm$^3$/10 min, refractive index nd: 1.582, specific gravity: 1.20, birefringence: 548 nm, and photoelastic coefficient: 80×10$^{-12}$ Pa$^{-1}$.

Comparative Example 3

D-NDM (220.00 g; 0.990 mol), DMT (48.05 g; 0.247 mol), diphenyl carbonate (DPC) (162.00 g; 0.756 mol), and titanium tetrabutoxide (38.5 mg; 11.3×10$^{-5}$ mol) were each added into a 500 mL reactor equipped with a stirrer and a distillation apparatus. The same operations as those in Example 1 were performed on the obtained mixture, so as to obtain a polyester carbonate resin (iii).

The physical properties of the polycarbonate resin (iii) were as follows: Mw: 29,000, Tg: 138° C., MVR: 40 cm³/10 min, refractive index nd: 1.545, specific gravity: 1.22, birefringence: 140 nm, and photoelastic coefficient: $25 \times 10^{-12}$ $Pa^{-1}$.

Comparative Example 4

D-NHEs (320.00 g) and titanium tetrabutoxide (100 mg; $29.4 \times 10^{-5}$ mol) were each added into a 500 mL reactor equipped with a stirrer and a distillation apparatus. Thereafter, nitrogen gas was introduced into the reaction system, and the obtained mixture was then heated to 250° C. in a nitrogen atmosphere at a pressure of 101.3 kPa over 2 hours, while stirring. When predetermined methanol was distillated, pressure reduction was initiated, and the pressure was reduced to 0.133 kPa or less over 1 hour. In addition, at the same time as initiation of the pressure reduction, the temperature was increased to 270° C. over 2 hours, and the reaction mixture was then retained at a pressure of 0.133 kPa or less for 3 hours, so as to obtain a polyester resin (iv).

The physical properties of the polycarbonate resin (iv) were as follows: Mw: 33,000, Tg: 167° C., MVR: 7 cm³/10 min, refractive index nd: 1.535, specific gravity: 1.17, birefringence: 35 nm, and photoelastic coefficient: $1 \times 10^{-12}$ $Pa^{-1}$.

Comparative Example 5

D-NDM (152.54 g), CHDA (147.73 g), EG (74.56 g), and titanium tetrabutoxide (20 mg; $6.0 \times 10^{-5}$ mol) were each added into a 500 mL reactor equipped with a stirrer and a distillation apparatus. The same operations as those in Comparative Example 4 were performed on the obtained mixture, so as to obtain a polyester carbonate resin (v).

The physical properties of the polycarbonate resin (v) were as follows: Mw: 30,000, Tg: 103° C., MVR: 35 cm³/10 min, refractive index nd: 1.525, specific gravity: 1.18, birefringence: 95 nm, and photoelastic coefficient: $14 \times 10^{-12}$ $Pa^{-1}$.

The physical property values of the resins obtained in each of the Examples and Comparative Examples are as shown in Table 1.

TABLE 1

|  |  |  | Ex. 1 Polyester carbonate resin (1) | Ex. 2 Polyester carbonate resin (2) | Ex. 3 Polyester carbonate resin (3) | Ex. 4 Polyester carbonate resin (4) | Ex. 5 Polyester carbonate resin (5) | Ex. 6 Polyester carbonate resin (6) |
|---|---|---|---|---|---|---|---|---|
| Compound constituting constituent unit (I) | D-NHEs | mol % | 11.1 | 17.6 | 33.2 | 42.7 | 66.5 | 66.6 |
| Diol component constituting constituent unit (II) | D-NDM | mol % | 44.4 | 41.2 | 33.2 | 28.4 | 16.6 | — |
|  | BPA |  | — | — | — | — | — | — |
|  | CHDM |  | — | — | — | — | — | 16.6 |
|  | SPG |  | — | — | — | — | — | — |
|  | EG |  | — | — | — | — | — | — |
| Compound constituting constituent unit (III) | DPC | mol % | 44.5 | 41.2 | 33.6 | 28.9 | 16.9 | 16.8 |
| Dicarboxylic acid component | DMT | mol % | — | — | — | — | — | — |
|  | CHDA |  | — | — | — | — | — | — |
| Constituent unit (I)/Constituent unit (II) (molar ratio) |  |  | 20/80 | 30/70 | 50/50 | 60/40 | 80/20 | 80/20 |
| Physical properties | Mw | — | 31,000 | 29,000 | 29,000 | 30,000 | 27,000 | 29,000 |
|  | Tg | ° C. | 141 | 142 | 145 | 149 | 156 | 140 |
|  | MVR | cm³/10 min | 38 | 48 | 52 | 44 | 36 | 40 |
|  | Refractive index nd | — | 1.532 | 1.534 | 1.535 | 1.535 | 1.535 | 1.530 |
|  | Specific gravity | — | 1.19 | 1.19 | 1.18 | 1.18 | 1.17 | 1.19 |
|  | Birefringence | nm | 88 | 76 | 65 | 55 | 45 | 38 |
|  | Photoelastic coefficient | $\times 10^{-12}$ $Pa^{-1}$ | 6 | 5 | 4 | 4 | 3 | 7 |

|  |  |  | Ex. 7 Polyester carbonate resin (7) | Comp. Ex. 1 Polycarbonate resin (i) | Comp. Ex. 2 Polycarbonate resin (ii) | Comp. Ex. 3 Polyester carbonate resin (iii) | Comp. Ex. 4 Polyester resin (iv) | Comp. Ex. 5 Polyester resin (v) |
|---|---|---|---|---|---|---|---|---|
| Compound constituting constituent unit (I) | D-NHEs | mol % | 66.5 | — | — | — | 100 | — |
| Diol component constituting constituent unit (II) | D-NDM | mol % | — | 49.7 | — | 49.7 | — | 40 |
|  | BPA |  | — | — | 49.4 | — | — | — |
|  | CHDM |  | — | — | — | — | — | — |
|  | SPG |  | 16.6 | — | — | — | — | — |
|  | EG |  | — | — | — | — | — | 10 |
| Compound constituting constituent unit (III) | DPC | mol % | 16.9 | 50.3 | 50.6 | 37.9 | — | — |
| Dicarboxylic acid component | DMT | mol % | — | — | — | 12.4 | — | — |
|  | CHDA |  | — | — | — | — | — | 50 |
| Constituent unit (I)/Constituent unit (II) (molar ratio) |  |  | 80/20 | — | — | — | — | — |
| Physical properties | Mw | — | 26,000 | 32,000 | 33,000 | 29,000 | 33,000 | 30,000 |
|  | Tg | ° C. | 145 | 133 | 143 | 138 | 167 | 103 |
|  | MVR | cm³/10 min | 38 | 30 | 33 | 40 | 7 | 35 |
|  | Refractive index nd | — | 1.522 | 1.531 | 1.582 | 1.545 | 1.535 | 1.525 |

TABLE 1-continued

| | | | | | | | |
|---|---|---|---|---|---|---|---|
| Specific gravity | — | 1.18 | 1.20 | 1.20 | 1.22 | 1.17 | 1.18 |
| Birefringence | nm | 40 | 100 | 548 | 140 | 35 | 95 |
| Photoelastic coefficient | ×10$^{-12}$ Pa$^{-1}$ | 2 | 8 | 80 | 25 | 1 | 14 |

As shown in Table 1, the polyester carbonate resins obtained in Examples 1 to 7 and the films formed by molding these resins had excellent results regarding various types of optical properties.

On the other hand, various resin obtained in Comparative Example 1 to 3 and 5 were not sufficiently satisfactory because films formed by molding these resins had large specific gravity and low birefringence.

Moreover, the polyester resin obtained in Comparative Example 4 had a low MVR value and poor fluidity, and thus, this resin is problematic in terms of moldability.

The invention claimed is:

1. A polyester carbonate resin having a constituent unit (I) represented by the following general formula (1), a constituent unit (II) represented by the following general formula (2), and a constituent unit (III) represented by the following general formula (3):

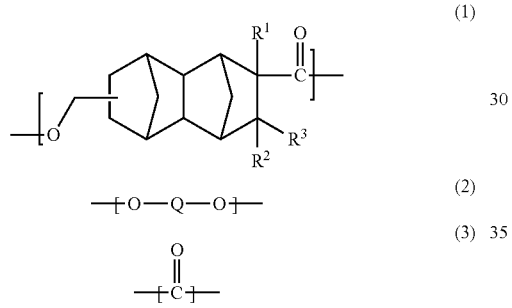

wherein, in the above formula (1), $R^1$ to $R^3$ each independently represent a hydrogen atom, a methyl group or an ethyl group, and in the above formula (2), Q represents a divalent linking group.

2. The polyester carbonate resin according to claim 1, wherein the constituent unit (I) comprises a constituent unit (Ia) derived from a compound represented by the following general formula (1a) and a constituent unit (Ib) derived from a compound represented by the following general formula (1b):

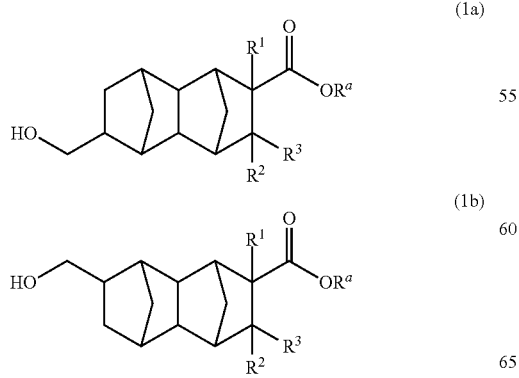

wherein, in the formulae (1a) and (1b), $R^1$ to $R^3$ are the same as those in the general formula (1), and $R^a$ represents an alkyl group containing 1 to 4 carbon atoms.

3. The polyester carbonate resin according to claim 2, wherein a content ratio [(Ia)/(Ib)] between the constituent unit (Ia) and the constituent unit (Ib) is 1/99 to 99/1 at a mass ratio.

4. The polyester carbonate resin according to claim 1, wherein Q in the general formula (2) is a group selected from among an alkylene group containing 1 to 10 carbon atoms, an alicyclic hydrocarbon group containing 3 to 30 ring-forming carbon atoms, an aromatic hydrocarbon groups containing 6 to 30 ring-forming carbon atoms, a heterocyclic group containing 3 to 30 ring-forming atoms, and a divalent linking group formed by combining two or more of these groups with one another.

5. The polyester carbonate resin according to claim 1, wherein Q in the general formula (2) is a divalent linking group represented by any of the following formulae (a) to (c):

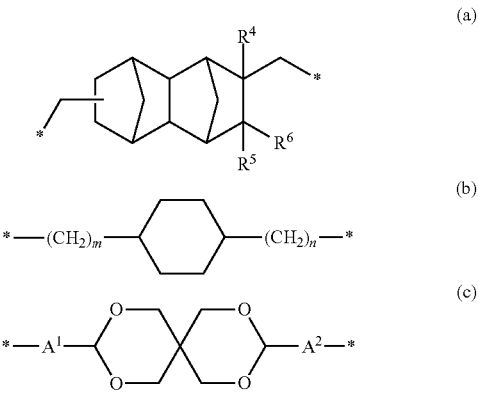

wherein * represents a binding site; $R^4$ to $R^6$ each independently represent a hydrogen atom or an alkyl group containing 1 to 6 carbon atoms, m and n each independently represent an integer of 0 to 4, and $A^1$ and $A^2$ each independently represent an alkylene group containing 1 to 10 carbon atoms.

6. The polyester carbonate resin according to claim 1, wherein the constituent unit (II) comprises a constituent unit (II-A) represented by the following general formula (2-a):

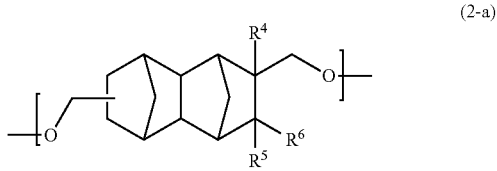

wherein $R^4$ to $R^6$ each independently represent a hydrogen atom or an alkyl group containing 1 to 6 carbon atoms.

7. The polyester carbonate resin according to claim 1, wherein the constituent unit (II) comprises a constituent unit (II-B) represented by the following general formula (2-b):

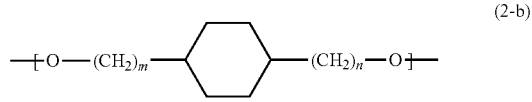

(2-b)

wherein m and n each independently represent an integer of 0 to 4.

8. The polyester carbonate resin according to claim 1, wherein the constituent unit (II) comprises a constituent unit (II-C) represented by the following general formula (2-c):

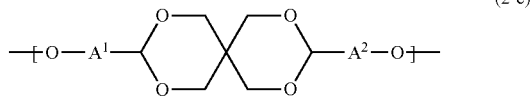

(2-c)

wherein $A^1$ and $A^2$ each independently represent an alkylene group containing 1 to 10 carbon atoms.

9. The polyester carbonate resin according to claim 1, wherein a content ratio [(I)/(II)] between the constituent unit (I) and the constituent unit (II) is 1/99 to 99/1 at a molar ratio.

10. The polyester carbonate resin according to claim 1, wherein the weight average molecular weight (Mw) of the polyester carbonate resin is 5,000 to 50,000.

11. The polyester carbonate resin according to claim 1, wherein the glass transition temperature (Tg) of the polyester carbonate resin is 135° C. or higher.

12. The polyester carbonate resin according to claim 1, wherein the specific gravity of the polyester carbonate resin is less than 1.20.

13. A molded body formed by molding a resin composition comprising the polyester carbonate resin according to claim 1.

14. The molded body according to claim 13, which is an optical member.

* * * * *